United States Patent
Manners

(10) Patent No.: US 10,386,797 B2
(45) Date of Patent: Aug. 20, 2019

(54) FRACTURING A SHELL OF A THREE-DIMENSIONAL OBJECT

(71) Applicant: 3D Systems, Inc., Rock Hill, SC (US)

(72) Inventor: Chris Robert Manners, Moorpark, CA (US)

(73) Assignee: 3D Systems, Inc., Rock Hill, SC (US)

( * ) Notice: Subject to any disclaimer, the term of this patent is extended or adjusted under 35 U.S.C. 154(b) by 661 days.

(21) Appl. No.: 14/487,160

(22) Filed: Sep. 16, 2014

(65) Prior Publication Data

US 2016/0075087 A1    Mar. 17, 2016

(51) Int. Cl.

| | |
|---|---|
| *B29C 67/00* | (2017.01) |
| *G05B 15/02* | (2006.01) |
| *G06F 17/50* | (2006.01) |
| *B33Y 10/00* | (2015.01) |
| *B33Y 30/00* | (2015.01) |
| *B33Y 50/00* | (2015.01) |
| *B29C 64/106* | (2017.01) |
| *B33Y 50/02* | (2015.01) |

(52) U.S. Cl.
CPC ............ *G05B 15/02* (2013.01); *B29C 64/106* (2017.08); *B33Y 10/00* (2014.12); *B33Y 30/00* (2014.12); *B33Y 50/00* (2014.12); *G06F 17/50* (2013.01); *B29C 67/00* (2013.01); *B33Y 50/02* (2014.12); *G06F 2217/12* (2013.01); *G06F 2217/44* (2013.01); *Y02P 90/265* (2015.11)

(58) Field of Classification Search
USPC ........................................................ 156/73.2
See application file for complete search history.

(56) References Cited

U.S. PATENT DOCUMENTS

| | | | | |
|---|---|---|---|---|
| 6,165,406 A | * | 12/2000 | Jang ................... | B29C 67/0081 264/308 |
| 6,506,477 B1 | * | 1/2003 | Ueda ................... | B29C 67/0074 156/148 |

(Continued)

FOREIGN PATENT DOCUMENTS

| | | |
|---|---|---|
| JP | 2002-292747 | 10/2002 |
| JP | 2007-533480 | 11/2007 |
| JP | 2013-114676 | 6/2013 |

OTHER PUBLICATIONS

Boolean operations on polygons.*

(Continued)

*Primary Examiner* — Ram N Kackar

(57) ABSTRACT

An apparatus is provided for fracturing a shell of a three-dimensional object. The apparatus may be caused to receive a shell of a three-dimensional object composed of a plurality of facets including first facets and distinct second facets, and form layer data defining a plurality of layers of the shell for use in forming the three-dimensional object on a layer-by-layer basis. At least some of the plurality of layers may include respective first fragments, and at least some of the plurality of layers may include respective second fragments. The first fragments may be produced by first facets and exclusive of second facets, and the second fragments may be produced by second facets and exclusive of first facets. And at least one layer of the plurality of layers may include both a first fragment of the respective first fragments, and a second fragment of the respective second fragments.

15 Claims, 8 Drawing Sheets

(56) References Cited

U.S. PATENT DOCUMENTS

| | | | | |
|---|---|---|---|---|
| 6,936,212 | B1* | 8/2005 | Crawford | B28B 1/00 264/308 |
| 7,879,260 | B2 | 2/2011 | Naruto et al. | |
| 2013/0060535 | A1* | 3/2013 | Fruth | B29C 67/0088 703/1 |
| 2013/0138234 | A1* | 5/2013 | Dufort | G06T 19/00 700/98 |
| 2014/0034214 | A1* | 2/2014 | Boyer | B29C 67/0051 156/73.2 |

OTHER PUBLICATIONS

PCT International Search Report the International Searching Authority for PCT/US2015/034177, dated Aug. 12, 2016 (4 pages).

Kumar V et al: "An Approach to Modeling Multi-Material Objects", Proceedings of the Fourth Symposium on Solid Modeling and Applications Atlanta, GA, May 14-16, 1997, pp. 336-345.

Anonymous: "Straight skeleton—Wikipedia, the free encyclopedia", Aug. 17, 2014 (204-08-17), pp. 1-5.

"Makerbot printing in Full Color!", Google Groups, https://groups.google.com/forum/#!topic/makerbot/OBi5dFnVHSY, Jul. 18, 2010, 26 pages.

PCT International Preliminary Report of the International Searching Authority for PCT/US2015/049059, dated Mar. 30, 2017 (15 pages).

PCT International Search Report the International Searching Authority for PCT/US2015/034177, dated Aug. 12, 2015 (4 pages).

PCT Written Opinion of the International Searching Authonty for PCT/US2015/034177, dated Aug. 12, 2015 (5 pages).

Kumar V et at: "An Approach to Modeling Multi-Material Objects", Proceedings of the Fourth Symposium on Solid Modeling and Applications Atlanta, GA; May 14-18, 1997, pp. 336-345.

Anonymous: "Stratght skeleton—Wikipedia, the free encyclopedia", Aug. 17, 2014 (204-08-17), pp. 1-5.

"Polygon mesh", Wikipedia, the free encyclopedia, http://en.wikipedia.org/w/index.php?title=Polygon_mesh&printable=yes, printed May 13, 2014, 13 pages.

Sean Charlesworth, "Bits to Atoms: An Overview of Today's 3D Printing Technologies", http://www.tested.com/tech/3d-printing/459851-bits-atoms-overview-todays-3d-printing-technologies/[Jun. 9, 2014 1:11:41 PM], Jan. 22, 2014, 23 pages.

"3D printing", Wikipedia, the free encyclopedia, http://en.wikipedia.org/w/index.php?title=3D_printing&printable=yes, printed May 13, 2014, 14 pages.

"Constructive solid geometry" Wikipedia,the free encyclopedia, http://en.wikipedia.org/w/index.php?title=Constructive_solid_geometry & printable=yes, printed May 13, 2014, 3 pages.

English Translation of Japan's First Non-Final Office Action for Japanese Patent Application No. 2017-514281 dated Jul. 5, 2018 (4 pages).

English machine translation of Japanese Application No. 20120242482 filed on Nov. 2, 2012 (Japanese Publication No. 2013-114676); retrieved from the Internet: URL: https://worldwide.espacenet.com/publicationDetails/biblioDB=EPODOC&II=1&ND=3&adjacent=true&locale=en_EP&FT=D&date=20130610&CC=JP&NR=2013114676A&KC=A (24 pages).

English machine translation of Japanese Application No. 2006521645 filed on Jul. 20, 2004 (Japanese Publication No. 2007-533480); retrieved from the Internet: URL: https://worldwide.espacenet.com/publicationDetails/biblio?DB=EPODOC&II=0&ND=3&adjacent=true&locale=en_EP&FT=D&date=20071122&CC=JP&NR=2007533480A&KC=A (29 pages).

* cited by examiner

FRACTURING A SHELL OF A THREE-DIMENSIONAL OBJECT

TECHNOLOGICAL FIELD

The present disclosure relates generally to additive manufacturing and, in particular, to fracturing a shell of a three-dimensional object for additive manufacturing of the same.

BACKGROUND

In recent years, many different additive manufacturing techniques for the fast production of three-dimensional objects have been developed. Additive manufacturing and related variations thereof are sometimes referred to as 3D printing, solid imaging, solid freeform fabrication, rapid prototyping and manufacturing and the like. Additive manufacturing includes many different techniques for forming three-dimensional objects on a layer-by-layer basis from a build material utilizing layer or sliced data representing cross-sections of the objects. These techniques include, for example, extrusion-deposition or selective deposition modeling (SDM) techniques such as fused deposition modeling (FDM) and fused filament fabrication (FFF), stereolithography (SLA), polyjet printing (PJP), multi jet printing (MJP), selective laser sintering (SLS), three-dimensional printing (3DP) techniques such as color-jet printing (CJP), and the like.

A number of additive manufacturing techniques form a three-dimensional object from a corresponding digital model, which is often provided by a computer-aided design system (this digital model at times referred to as a CAD model). The digital model may represent the object and its structural components by a collection of geometry. This digital model may be exported to another form that represents the closed-form surface geometry of the object, which at times may be referred to as a shell. In some examples, the shell of an object may take the form of a mesh of polygons (e.g., triangles), such as in the case of an STL (standard tessellation language) model or file. The shell of the object may then be sliced into layer data that defines layers of the shell. This layer data may be formatted into an appropriate language that describes a tool path for forming the object, which may be received by an additive manufacturing system to manipulate build material to form the object on a layer-by-layer basis.

Additive manufacturing techniques are evolving to incorporate build materials having different properties in the formation of a single object, which may permit more complex objects such as multi-colored objects. A number of techniques have been employed to prepare the data required to guide formation of such an object. One technique involves the initial creation of separate solid models for separate portions of an object to be formed from respective build materials, from which separate shells may be separately created and processed. But this technique requires the expertise of the CAD or other system used to create the solid models, and the added resources required to separately process each of the solid models.

In another technique, a single shell may be broken apart into usable portions. According to this technique, the shell may be separated into fragments, such as along well-defined edge lines. Once separated, the original closed-form shell now includes multiple unclosed-form fragments. The unclosed fragments must then be healed to form corresponding closed-form fragments that they may be separately sliced into respective layer data. This process is often complicated, requiring high-performance processors. The process also has a tendency to create non-symmetrical faces resulting in a poor match when the fragments are rejoined during formation of the object. This drawback may be amplified when dealing with shells that do not have well-defined edge lines such as those created from scanned (e.g., point-cloud) data.

Therefore, it may be desirable to have an apparatus and method that improves upon existing techniques.

BRIEF SUMMARY

Example implementations of the present disclosure are generally directed to an improved apparatus, method and computer-readable storage medium for fracturing a shell of a three-dimensional object. In accordance with example implementations, a user may easily select a portion of a single shell, such as may designate a portion of an object to be formed from a second build material (another portion of which may be formed from a first build material). Example implementations may then create healed fragments of the shell for the selected portion and another, remaining portion of the object during the slice process. These fragments may be created through a process that reduces if not eliminates any time-consuming preprocessing of the shell, and that may be easily performed on models designed from CAD or produced from scanned data. And in some examples, the process may be further used to provide cleaner seams between multiple build materials as compared to current techniques.

According to one aspect of example implementations, an apparatus is provided for fracturing a shell of a three-dimensional object. The apparatus includes a processor and a memory storing executable instructions that in response to execution by the processor cause the apparatus to at least perform a number of operations. In this regard, the apparatus may be caused to receive a shell of a three-dimensional object composed of a plurality of facets including first facets and distinct second facets, and form layer data defining a plurality of layers of the shell for use in forming the three-dimensional object on a layer-by-layer basis. At least some of the plurality of layers may include respective first fragments, and at least some of the plurality of layers may include respective second fragments. The first fragments may be produced by first facets and exclusive of second facets, and the second fragments may be produced by second facets and exclusive of first facets. And at least one layer of the plurality of layers may include both a first fragment of the respective first fragments, and a second fragment of the respective second fragments.

In some examples, for a layer of the at least one layer that includes both a first fragment of the respective first fragments, and a second fragment of the respective second fragments, the first fragment and second fragment may be separated by an offset gap.

In some examples, the apparatus being caused to form the layer data may include being caused to format the layer data for receipt by an additive manufacturing system configured to manipulate build material to form the three-dimensional object on a layer-by-layer basis.

In some further examples, the additive manufacturing system may include a first extruder and a distinct, second extruder configured to dispense respective build material to form the three-dimensional object on a layer-by-layer basis. In these examples, the apparatus being caused to format the layer data may include being caused to format the layer data for the respective first fragments for receipt by the first extruder, and the layer data for the respective second fragments for receipt by the second extruder.

In other further examples, the additive manufacturing system may include a laser configured to emit a beam onto build material to form the three-dimensional object on a layer-by-layer basis. In these examples, the apparatus being caused to format the layer data may include being caused to format the layer data for receipt by the laser, with one or more properties of the beam emitted by the laser differing between the layer data for the respective first fragments, and the layer data for the respective second fragments.

In yet other further examples, the additive manufacturing system may include a first printhead and a distinct, second printhead configured to deliver respective binder onto build material to form the three-dimensional object on a layer-by-layer basis. In these examples, the apparatus being caused to format the layer data may include being caused to format the layer data for the respective first fragments for receipt by the first printhead, and the layer data for the respective second fragments for receipt by the second printhead.

The apparatus may be caused to form the layer data for layer(s) that includes both a first fragment of the respective first fragments, and a second fragment of the respective second fragments, in any of a number of different manners. In some examples, for a layer of such layers, the apparatus may be caused to receive the layer defining an initial polygon composed of first and second segments produced by respective ones of first and second facets that intersect the layer, a second segment of the first and second segments meeting other segments at a pair of vertices. The apparatus may be caused to migrate the pair of vertices a depth within the initial polygon to a corresponding pair of vertices, create segments to connect vertices of the corresponding pair of vertices, and connect vertices of the pair of vertices with respective ones of the vertices of the corresponding pair of vertices to form an initial second polygon within the initial polygon. The apparatus may be caused to form a Boolean intersection between the initial polygon and initial second polygon to produce a second polygon, and form a Boolean difference between the initial polygon and second polygon to produce a first polygon. The first fragment of the layer, then, may define the first polygon, and the second fragment of the layer may define the second polygon.

In other aspects of example implementations, a method and computer-readable storage medium are provided for fracturing a shell of a three-dimensional object. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
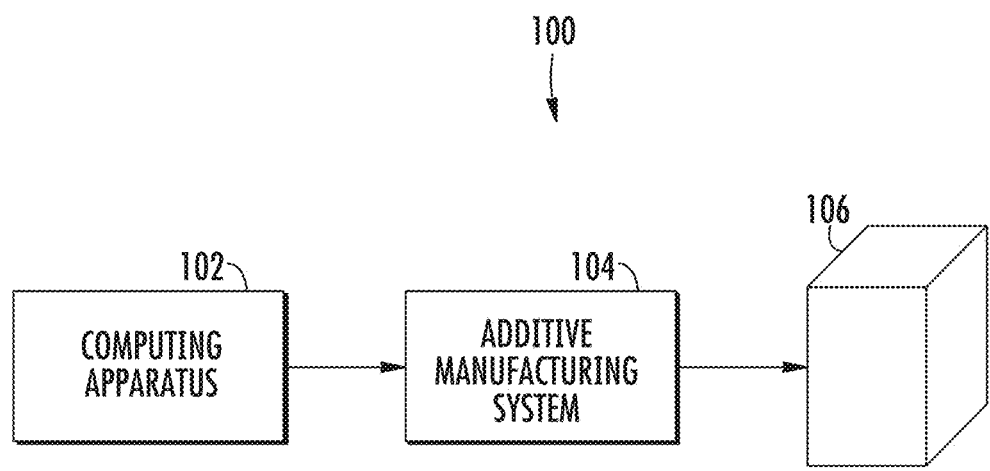
FIG. 1 is an illustration of a system including a computing apparatus and additive manufacturing system, in accordance with example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Like reference numerals refer to like elements throughout.

Example implementations of the present disclosure relate generally to additive manufacturing and, in particular, to fracturing a shell of a three-dimensional object for additive manufacturing of the same. It should be understood, however, that example implementations may be utilized in conjunction with a variety of other applications, including those outside of additive manufacturing.

Referring now to FIG. 1, a system 100 is illustrated according to example implementations of the present disclosure. The system may include any of a number of different apparatuses, subsystems and the like for performing one or more functions or operations. As shown, for example, the system may include a computing apparatus 102 and an additive manufacturing system 104. The computing apparatus is generally configured to receive and prepare data for receipt by the additive manufacturing system, and from which the additive manufacturing system may be configured to manipulate build material to form a physical, tangible three-dimensional object 106.

As shown more particularly in FIGS. 2A, 2B, 2C and 2D, for example, the computing apparatus 102 may be configured to receive a shell 200 of a three-dimensional object composed of a plurality of facets including first facets and distinct second facets such as first facets 202*a* and second facets 202b. In accordance with example implementations, the shell may be a digital representation of the object that represents its closed-form surface geometry. In some examples, the shell may take the form of a mesh of polygons (e.g., triangles), such as in the case of an STL (standard tessellation language) model or file. And in some examples, the shell may be created by exporting a digital model of the object, such as that produced by an appropriate CAD system.

In some examples, the facets (e.g., triangles) are first facets 202a at least some of which have been user-selected and thereby serve as the second facets 202b. The facets may then be saved along with identifiers for the second facets. The facets may be selected in any of a number of different manners, such as using a pointer to select the facets in a graphical user interface (GUI) in which the shell 200 may be displayed. In a more particular example in which facets are selected to color particular portion(s) of an object, the facets may be selected using an appropriate tool (e.g., paintbrush) of a graphics painting program to color the respective facets. Example implementations are described herein in the context of first and second facets, although it should be understood that example implementations may be equally applicable to greater numbers of facets, which may accommodate greater numbers of fragments and thus greater variability of different build material that may be used to form an object.

Regardless of the manner by which the shell 200 is made to include first and second facets 202a, 202b, the computing apparatus 102 may be configured to form layer data defining a plurality of layers 204 of the shell for use in forming the three-dimensional object 106 on a layer-by-layer basis, and may use the first and second facets to do so. In this regard, at least some of the plurality of layers may include respective first fragments such as first fragments 206b, 206d, which may be produced by first facets 202a and exclusive of second facets 202b. In this regard, a first fragment of a layer may define a first polygon produced by first facets that intersect the layer exclusive of any second facets that also intersect the layer. Similarly, at least some of the plurality of layers may include respective second fragments such as second fragments 208b, 208c, which may be produced by second facets and exclusive of first facets. For a second fragment of a layer, the second fragment may define a second polygon produced by second facets that intersect the layer without any first facets that also intersect the layer.

Figure 2A:
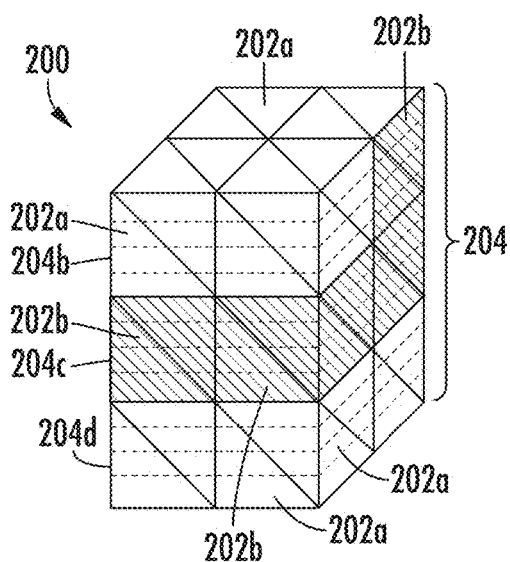
FIGS. 2A, 2B, 2C and 2D illustrate a suitable shell of a three-dimensional object, and various layers thereof, in accordance with example implementations of the present disclosure.
Figure 2B:
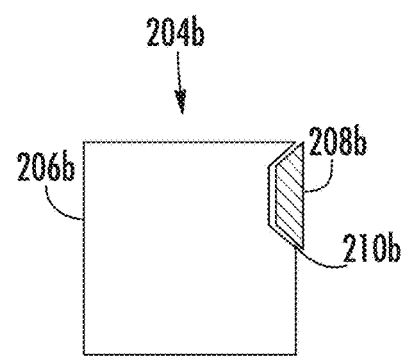
Figure 2C:
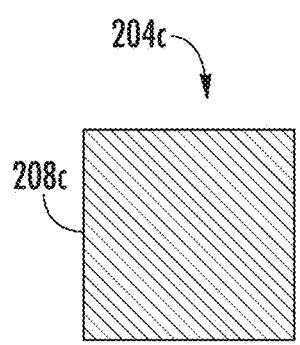
Figure 2D:
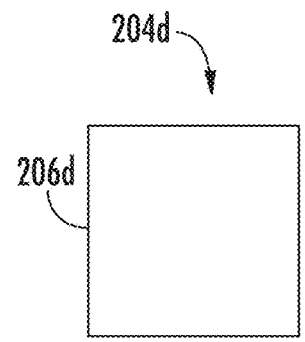

In some examples, as shown in FIG. 2B, at least one layer 204b of the plurality of layers 204 may include both a first fragment 206b of the respective first fragments, and a second fragment 208b of the respective second fragments. In at least some of these examples, the first fragment and second fragment may be separated by an offset gap 210b. As shown in FIG. 2C, in some examples, at least one layer 204c may include a second fragment 208c of the respective second fragments, exclusive of or otherwise without any of the respective first fragments. And as shown in FIG. 2D, in some examples, at least one layer 204d may include a first fragment 206d of the respective first fragments, exclusive of or otherwise without any of the respective second fragments.

Figure 3:
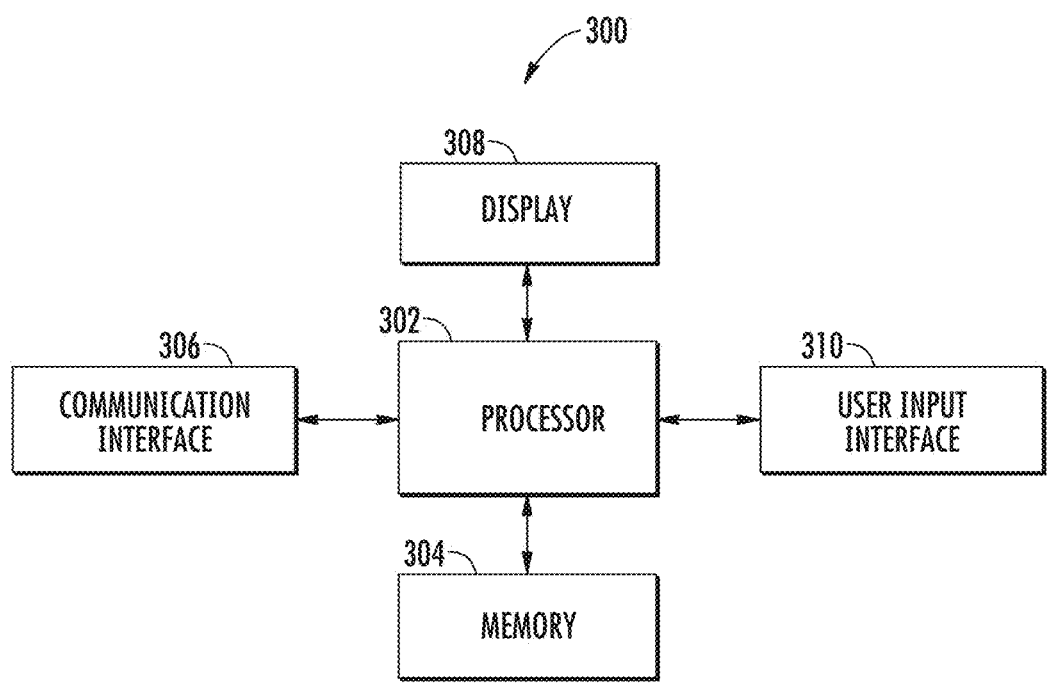
FIG. 3 illustrates an apparatus that in some examples may correspond to the computing apparatus of the system illustrated in FIG. 1.

FIG. 3 illustrates an apparatus 300 that in some examples may correspond to the computing apparatus 102 of FIG. 1. In some examples, the apparatus may be provided by more than one apparatus connected to or otherwise in communication with one another in a number of different manners, such as directly or indirectly by wire or via a wired or wireless network or the like.

Generally, the apparatus 300 may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 302 connected to a memory 304. In this regard, the apparatus may include hardware configured to function as or otherwise implement operations according to example implementations, alone or under direction of one or more computer program code instructions, program instructions or executable computer-readable program code instructions (at times generally referred to as "computer programs," e.g., software, firmware, etc.) from a computer-readable storage medium.

The processor 302 is generally any piece of computer hardware capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory (of the same or another apparatus).

The memory 304 is generally any piece of computer hardware capable of storing information such as, for example, data, computer programs and/or other suitable information either on a temporary basis and/or a permanent basis. The memory may include volatile and/or non-volatile memory, and may be fixed or removable. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory 304, the processor 302 may also be connected to one or more interfaces for displaying, transmitting and/or receiving information. The interfaces may include a communications interface 306 and/or one or more user interfaces. The communications interface may be configured to transmit and/or receive information, such as to and/or from the apparatus 300 and other apparatus(es), network(s) or the like. The communications interface may be configured to transmit and/or receive information by physical (wired) and/or wireless communications links.

The user interfaces may include a display 308 and/or one or more user input interfaces 310. The display may be configured to present or otherwise display information to a user. The user input interface may be configured to receive information from a user into the apparatus 300, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners, additive manufacturing systems or the like.

Briefly returning to FIG. 1, the computing apparatus 102 may also be configured to format the layer data for receipt by the additive manufacturing system 104, which as indicated above may be configured to manipulate build material to form the three-dimensional object 106 on a layer-by-layer basis. This may include the computing apparatus being configured to format the layer data into an appropriate language that describes one or more tool paths for forming the object, which may be received by an additive manufacturing system to manipulate build material to form the object on a layer-by-layer basis. In some examples, the computing apparatus may be configured to format the layer data to describe tool paths for respective ones of the first fragments (e.g., first fragments 206b, 206d) and second fragments (e.g., second fragments 208b, 208c).

In some examples, the computing apparatus 102 may selectively place one or more seams where the build material provided by one tool path comes together with the build material provide by another tool path, or otherwise where the tool path for a build material ends. This may be accomplished in any of a number of different manners, and may result in cleaner seams between multiple build materials. For example, the computing apparatus may selectively place a seam for the build material provided by one tool path underneath the build material provided by another tool path.

Figure 4:
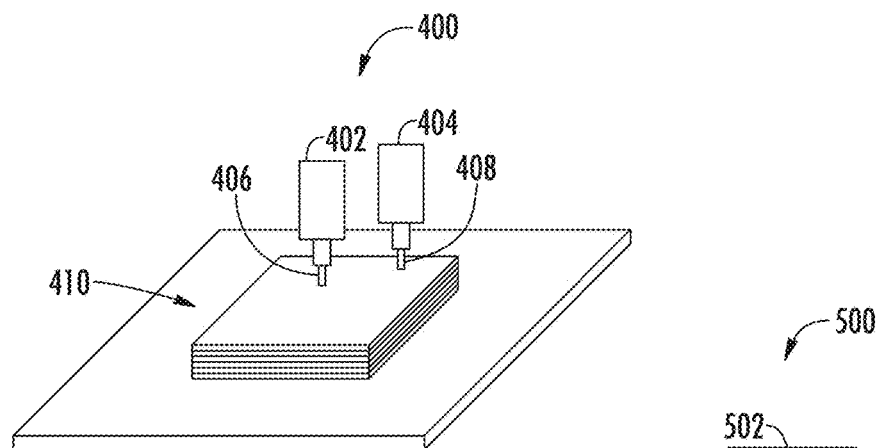
FIGS. 4, 5 and 6 illustrate respective additive manufacturing systems, which may in some examples correspond to the additive manufacturing system of FIG. 1.
Figure 5:
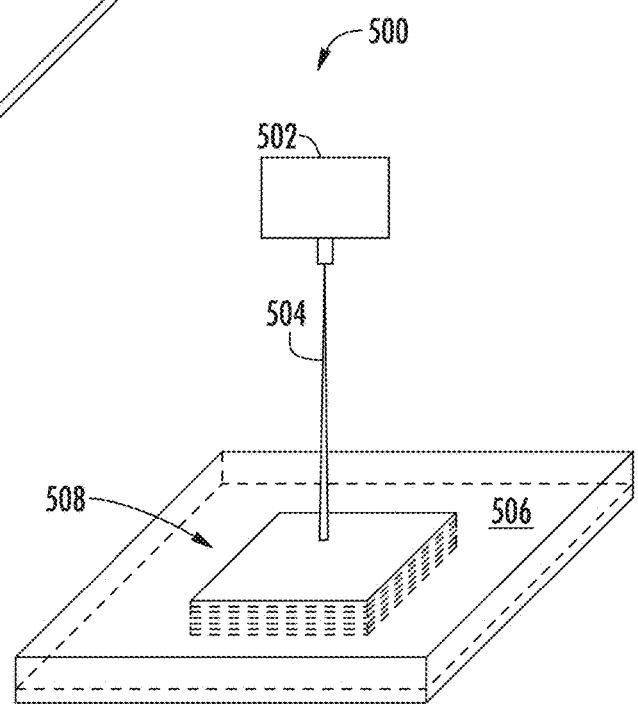
Figure 6:
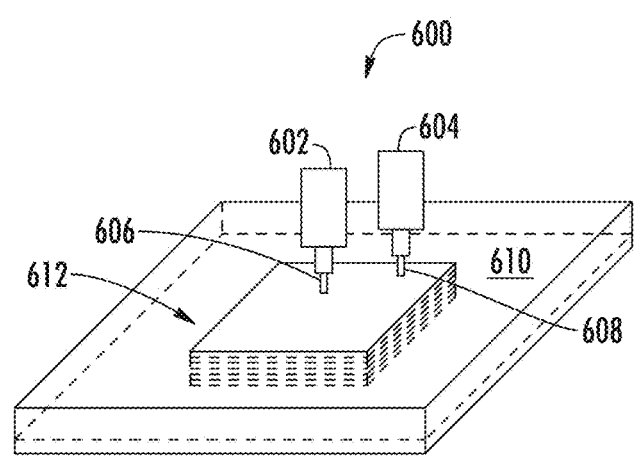

The additive manufacturing system 104 may be configured to form the object in accordance with any of a number of additive manufacturing techniques. Examples of suitable additive manufacturing techniques include extrusion-deposition or selective deposition modeling (SDM) techniques such as fused deposition modeling (FDM) and fused filament fabrication (FFF), stereolithography (SLA), polyjet printing (PJP), multi-jet printing (MJP), selective laser sintering (SLS), three-dimensional printing (3DP) techniques such as color-jet printing (CJP), and the like. FIGS. 4, 5 and 6 illustrate respective additive manufacturing systems 400, 500 and 600, which may in some examples correspond to the additive manufacturing system 104 of FIG. 1.

FIG. 4 illustrates an additive manufacturing system 400 that may be configured to operate according to any of a number of different extrusion-based or selective deposition modeling (SDM) techniques such as fused deposition modeling (FDM), fused filament fabrication (FFF) or the like. As shown, the additive manufacturing system 400 may include a first extruder 402 and a distinct, second extruder 404 configured to dispense respective build material 406, 408 to form a three-dimensional object 410 (e.g., object 106) on a layer-by-layer basis. Examples of suitable build materials include thermoplastics, high-density polyethylene (HDPE), eutectic metals, edible materials, rubber, modelling clay, plasticine, RTV silicone, porcelain, metal clay and the like.

The computing apparatus 102 may be configured to format the layer data for the respective first fragments (e.g., first fragments 206b, 206d) for receipt by the first extruder 402, and the layer data for the respective second fragments (e.g., second fragments 208b, 208c) for receipt by the second extruder 404. And in some examples, at least one property of the build material 406 dispensed by the first extruder may be different from a corresponding at least one property of the build material 408 dispensed by the second extruder. One example of a suitable property that may differ between the build materials of the first and second extruders is color, which may thereby permit formation of a multi-colored object. Other examples of suitable properties include physical properties such as brittleness, elasticity, hardness, plasticity, strength, stiffness, thermal conductivity or the like.

FIG. 5 illustrates an additive manufacturing system 500 that may be configured to operate according to additive manufacturing techniques such as stereolithography (SLA), selective laser sintering (SLS) or the like. As shown, the additive manufacturing system 500 may include a laser 502 configured to emit a beam 504 onto build material 506 to form a three-dimensional object 508 (e.g., object 106) on a layer-by-layer basis. Here, examples of suitable build materials include photopolymers, thermoplastics, metal powders, ceramic powders and the like. The computing apparatus 102 may be configured to format the layer data for receipt by the laser, with one or more properties of the beam emitted by the laser differing between the layer data for the respective first fragments (e.g., first fragments 206b, 206d), and the layer data for the respective second fragments (e.g., second fragments 208b, 208c).

FIG. 6 illustrates an additive manufacturing system 600 that may be configured to operate according to three-dimensional printing (3DP) techniques such as color-jet printing (CJP) or the like. As shown, the additive manufacturing system may include a first printhead 602 and a distinct, second printhead 604 configured to deliver respective binder 606, 608 onto build material 610 to form a three-dimensional object 612 (e.g., object 106) on a layer-by-layer basis. Examples of suitable build materials include starch, gypsum plaster, sand, acrylic powder, sugar and the like, while examples of suitable binders include water or water-based liquids, calcium carbonate, cyanoacrylate, other types of liquids and the like.

The computing apparatus 102 may be configured to format the layer data for the respective first fragments (e.g., first fragments 206b, 206d) for receipt by the first printhead, and the layer data for the respective second fragments (e.g., second fragments 208b, 208c) for receipt by the second printhead. And in some examples, at least one property of the binder delivered by the first printhead may be different from a corresponding at least one property of the binder delivered by the second printhead. Similar to that described above, one example of a suitable property that may differ between the binders of the first and second printheads is color, which in some examples may be applied by the addition of a dye to the binder, and which again, may permit formation of a multi-colored object. Also similar to above, other examples of suitable properties include physical properties such as brittleness, elasticity, hardness, plasticity, strength, stiffness, thermal conductivity or the like.

Figure 7A:
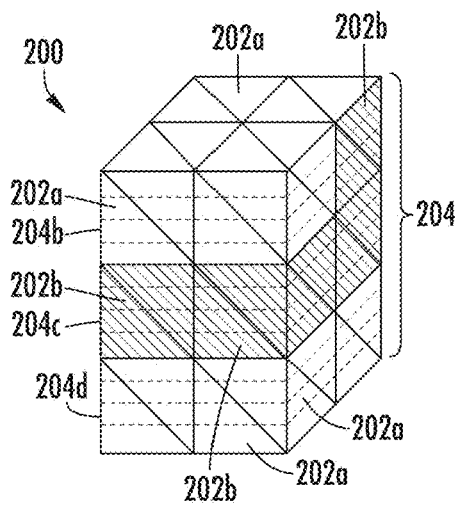
FIGS. 7A-7H illustrate operations that may be performed to form layer data for a layer that includes both first and second fragments, in accordance with some example implementations.
Figure 7B:
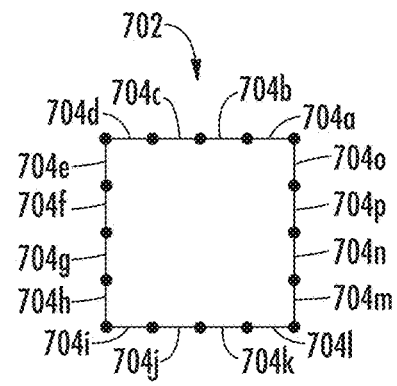

Again briefly returning to FIG. 1, the computing apparatus 102 may be configured to form layer data in any of a number of different manners. FIGS. 7A-7H illustrate operations that may be performed to form layer data for a layer that includes both first and second fragments, in accordance with some example implementations. This may be the case, for example, for layer 204b including first fragment 206b and second fragment 208b of the respective second fragments, as shown in FIG. 7A. As shown, various facets (e.g., triangles) of the shell 200 may intersect the layer and produce segments, which may be tagged with which of the first and second fragments the segments belong. The segments may be sorted and connected to form an initial polygon that includes vertices, which in some examples, may similarly be tagged with which of the first and second fragments the segments belong. In some examples, the first and second fragments may have common vertices, but have unique segments. In instances in which vertices connect segments of different fragments, the complementary vertex that forms the segment from the first fragment may have a default tag indicating that it is of the first fragment. As shown in FIG. 7B, the computing apparatus may receive the layer (e.g., layer 204b) defining an initial polygon 702 composed of first segments 704a-n and second segments 704o, p produced by respective ones of first and second facets 202a, 202b that intersect the layer.

The initial polygon 702 may have a closed form. The computing apparatus 102 may now fracture the initial polygon along its first segments 704a-n and second segments 704o, p to create first and second polygons for respective ones of the first fragment 206b and second fragment 208b, each of the first and second polygons (as well as other polygons described herein) having a closed form similar to the initial polygon. The computing apparatus may fracture the initial polygon in any of a number of different manners, including through performance of one or more of the operations illustrated in FIGS. 7C-7G.

Figure 7C:
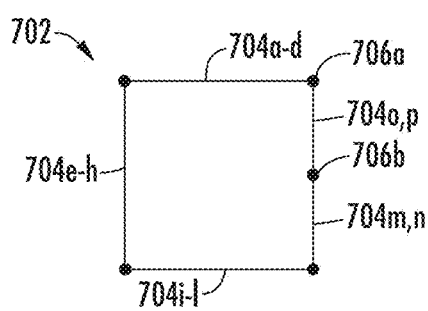

As shown in FIG. 7C, in some examples, the computing apparatus 102 may combine various first segments together, and/or various second segments together, such as those segments that are collinear. In these examples, the first segments may include one or more first segments formed of the combination of smaller first segments, and/or the second segments may include one or more second segments formed of the combination of smaller second segments. Regardless of whether the computing apparatus combines segments, however, a second segment 704o, p of the first and second segments may meet other segments at a pair of vertices 706a, 706b.

Figure 7D:
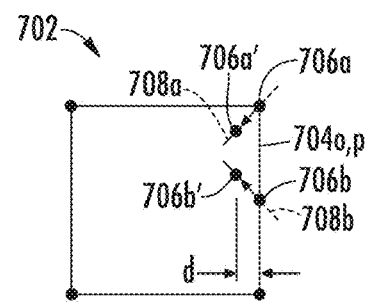
Figure 7E:
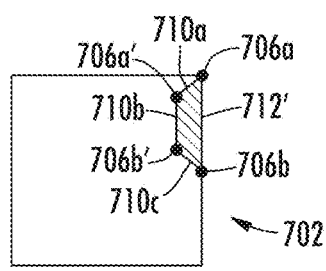

As shown in FIG. 7D, the computing apparatus 102 may migrate the pair of vertices 706a, 706b a depth d within the initial polygon 702 to a corresponding pair of vertices 706a', 706b'. In some examples, the computing apparatus may migrate the vertices along respective vertex bisectors 708a, 708b situated to bisect respective angles formed thereat. The computing apparatus may then create segments 710a, 710b, 710c to connect vertices of the corresponding pair of vertices 706a', 706b', and connect vertices of the pair of vertices 706a, 706b with respective ones of the vertices of the corresponding pair of vertices to form an initial second polygon 712' within the initial polygon, as shown in FIG. 7E.

Figure 7F:
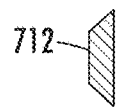
Figure 7G:
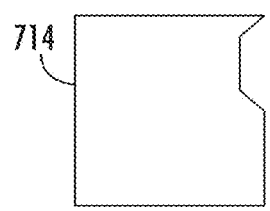
Figure 7H:
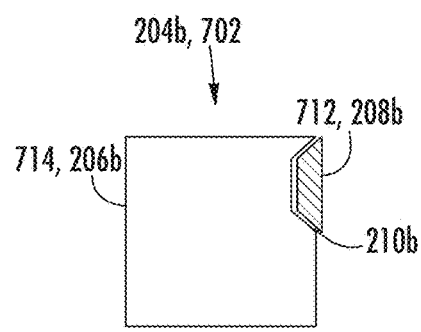

The computing apparatus 102 may form a Boolean intersection between the initial polygon 702 and initial second polygon 712' to produce a second polygon 712. This may assure that the fractured, first and second polygons are not larger that than the initial polygon, and it may produce resized fractured polygons. The computing apparatus may then cut the second polygon from the initial polygon to produce a first polygon 714. In this regard, the computing apparatus may form a Boolean difference between the initial polygon and second polygon to produce the first polygon, as shown in FIGS. 7F and 7G. As shown in FIG. 7H (as compared to FIG. 2B), then, the first fragment 206b of the layer 204b may define the first polygon 714, and the second fragment 208b of the layer may define the second polygon 712.

Figure 8:
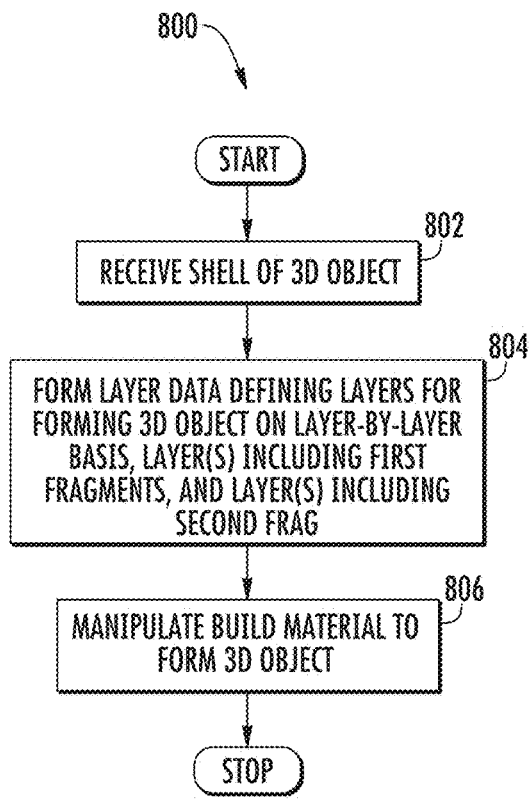
FIG. 8 is a flowchart illustrating various operations in a method of fracturing a shell of a three-dimensional object, according to some example implementations.

FIG. 8 illustrates various operations in a method 800 of fracturing a shell of a three-dimensional object, according to some example implementations of the present disclosure. As shown in block 802, the method includes receiving a shell of a three-dimensional object composed of a plurality of facets including first facets and distinct second facets. As shown in at in block 804, the method also includes forming layer data defining a plurality of layers of the shell for use in forming the three-dimensional object on a layer-by-layer basis. In this regard, at least some of the plurality of layers may include respective first fragments produced by first facets and exclusive of second facets, and at least some of the plurality of layers may include respective second fragments produced by second facets and exclusive of first facets. In some examples, at least one layer of the plurality of layers may include both a first fragment of the respective first fragments, and a second fragment of the respective second fragments. And forming the layer data may include its being formatted for receipt by an additive manufacturing system configured to manipulate build material to form the three-dimensional object on a layer-by-layer basis, as shown in block 806.

Figure 9:
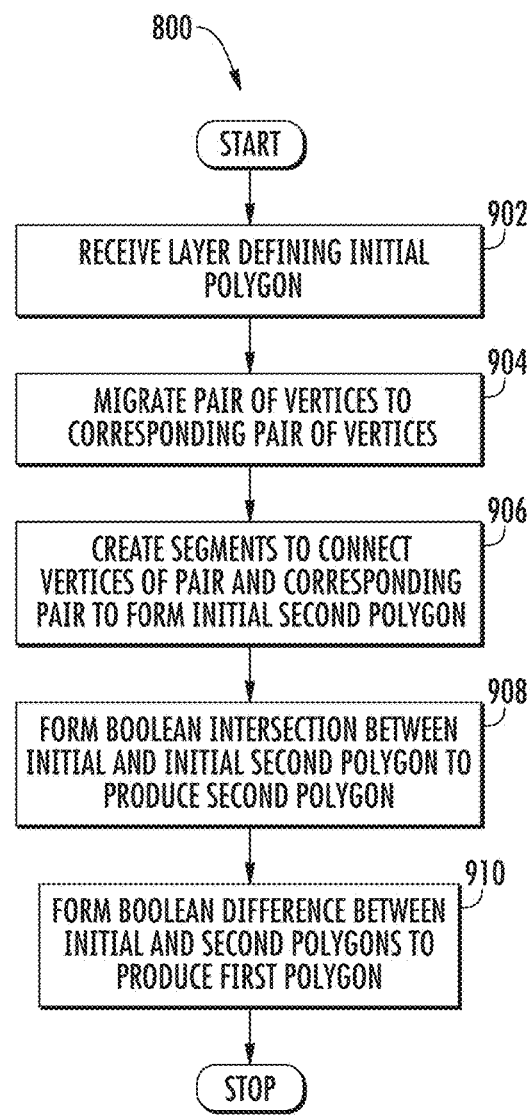
FIG. 9 illustrates various operations in a method of forming layer data for a layer of that includes both first and second fragments, in accordance with some example implementations.

FIG. 9 illustrates various operations in a method 900 of forming layer data for a layer of that includes both first and second fragments, in accordance with some example implementations of the present disclosure. As shown at block 902, the method may include receiving the layer defining an initial polygon composed of first and second segments produced by respective ones of first and second facets that intersect the layer, with a second segment of the first and second segments meeting other segments at a pair of vertices. The method may also include migrating the pair of vertices a depth within the initial polygon to a corresponding pair of vertices, creating segments to connect vertices of the corresponding pair of vertices, and connecting vertices of the pair of vertices with respective ones of the vertices of the corresponding pair of vertices to form an initial second polygon within the initial polygon, as shown at blocks 904 and 906. A Boolean intersection may be formed between the initial polygon and initial second polygon to produce a second polygon, and a Boolean difference may be formed between the initial polygon and second polygon to produce a first polygon, as shown at blocks 908 and 910. The first fragment of the layer, then, may define the first polygon, and the second fragment of the layer may define the second polygon.

Figure 10:
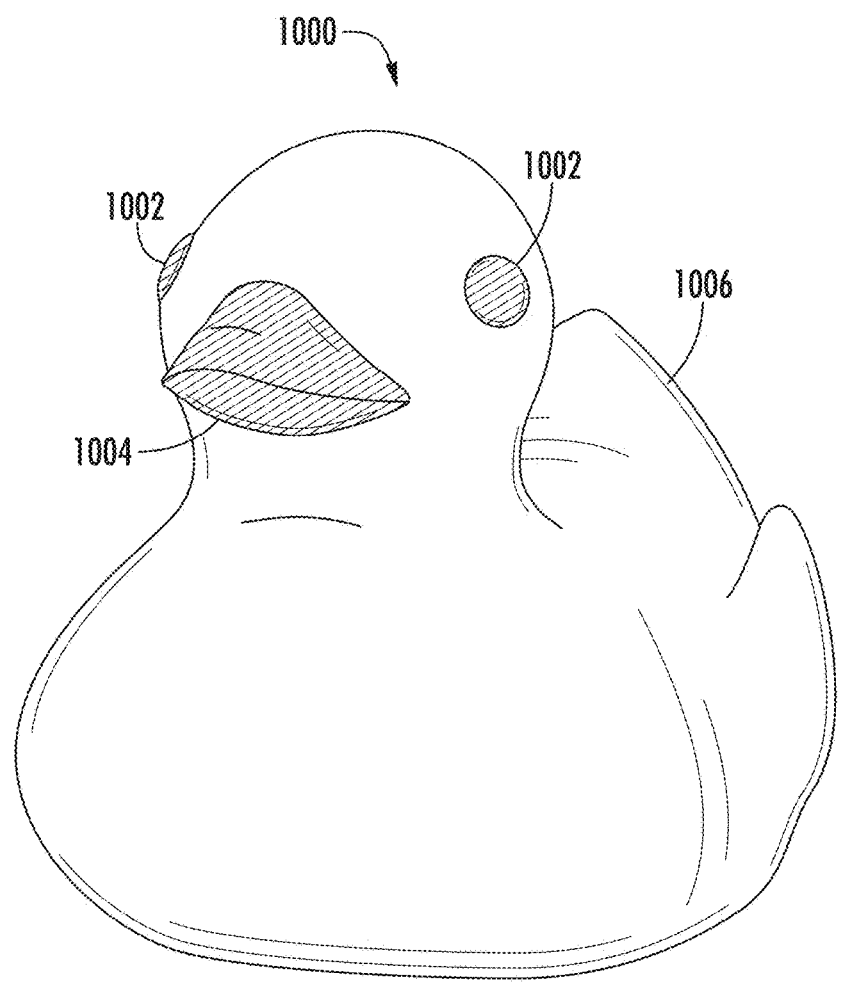
FIGS. 10, 11 and 12 illustrate a shell of a duck in various stages of process before formation by an extrusion-based additive manufacturing system, in accordance with some example implementations.
Figure 11:
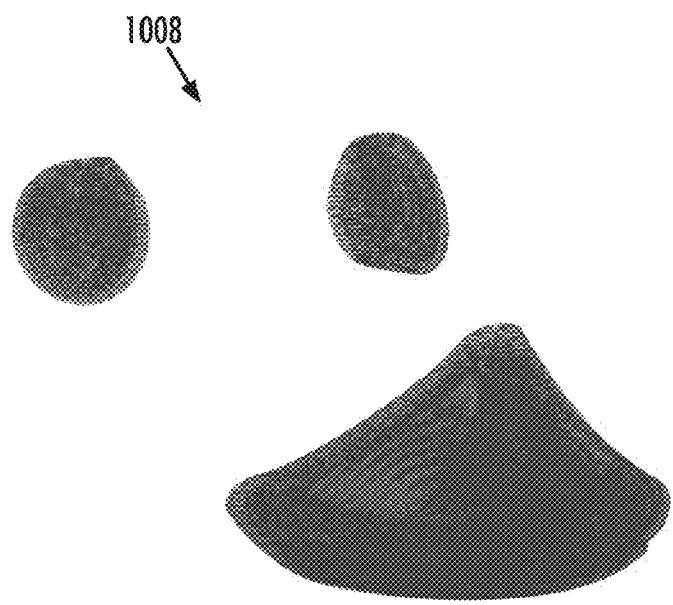
Figure 12:
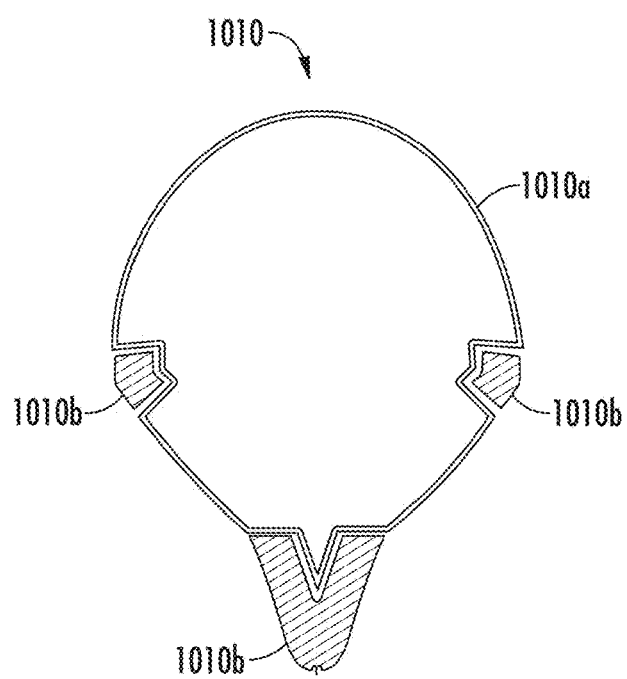

To further illustrate at least some of the benefits or advantages of example implementations of the present application, reference is now drawn to FIGS. 10, 11 and 12, which illustrate a shell of a duck 1000 in various stages of process before formation by an extrusion-based additive manufacturing system such as additive manufacturing system 400 that includes multiple extruders 402, 404. In these examples, the extruders may be assigned build material having different properties such as color to permit forming a multi-colored object, in this case a multi-colored duck. In accordance with example implementations, one or more portions of the object may be selected to have a color different from the rest of the object. FIG. 10 illustrates the duck's shell 1000 with its eyes 1002 and beak 1004 selected to be extruded in a color different from the body 1006 of the duck. In examples in which the shell takes the form of a polygon mesh (e.g., STL file), facets of the mesh for the colored (or differently colored) portion(s) of the object may be selected.

Also in accordance with example implementations, the shell may be fractured into multiple fragments during slicing of the shell into layer data that defines layers of the shell. Each of the fragments may be assigned a respective color, and thus a respective extruder 402, 404 of the additive manufacturing system 400. FIG. 11 illustrates the tool path 1008 for the extruder assigned to the (second) fragments assigned a particular color for the eyes 1002 and beak 1004 of the duck 1000. And FIG. 12 illustrates the tool paths 1010 for one layer of the shell of the duck, including a tool path 1010a for the first extruder 402 to form the duck's body, and another tool path 1010b for the second extruder 404 to form the duck's eyes and beak.

Again and as described above, the computing apparatus 102 of example implementations may be configured to form layer data in any of a number of different manners. Below is pseudocode describing various operations executable or otherwise performable by the computing apparatus to form layer data, in accordance with some example implementations of the present disclosure.

```
Fragmented slice layer
For all triangles in triangle list
   if triangle is within current layer
   then
      create segment from triangle and tag segment with triangle
ID non-zero represent fractured points
      save segment to segment list
end all triangles
Sort segment list
Create the cross section boundary at given z height from sorted
segment list
// identify all vertices that are from fragments
 Collect_fragmentPoint (cross section boundary)
// Process them into a container for future work
process_fragmentPoints (cross section boundary)
// make a copy of the original cross section boundary and
compensate that boundary the amount of desired fracture depth
// create the new fractured boundaries
Fractured boundaries = process_fragmentPoints (original cross
section, copied compensated cross section)
Intersect the Fractured boundaries with the original cross section
boundary to trim the Fractured boundaries.
Subtract the Fractured boundaries from the original cross section
boundary to create two separate cross section boundaries. The
original shell without the fractured pieces and the fractured pieces.
Now compensate the fractured boundaries the desired amount
you want to offset from the original cross
section as to not overlap any boundary borders.
collect_fragmentPoints ( POLYLIST *pl )
{
    POLYLINE *p;
    StartOfFracture is False;
    for (each polyline p in polylist p1)
    {
        Create new empty fragment list
        for (each vertex v in polyine p)
        {
            if (v is tagged as fracture vertex)
            {
                Save v in current fragment vertexList
            }
            else
            {
                end of current fragment list
                if fragmen list not empty
                {
                    save current fragment list
                }
                create new empty fragment list
            }
        }
    }
}
process_fragmentPoints ( POLYLIST *pl )
{
   POLYLINE *p;
   for (each polyline p in polylist p1)
   {
       for (each vertex v in polyine p)
       {
           for (each f fragment in framentList)
           {
               For (each fv fragmentVertex in fragment)
               {
                   If (fv == v)
                      mark polyline vertex v as fragment
                      break out of fragment loop
               }
           }
       }
   }
}
// p1 is the original boundary
//p2 is the compensated boundary based on the fracture depth
// the resultant boundaries in the returned polylist are the
collected fractured boundary pieces
POLYLIST * process_fragmentPoints (POLYLIST *p1, POLYLIST *p2 )
{
```

-continued

```
// process all closed boundaries in the layer cross section
for (each polyline p in polylist p1)
{
    If a vertex point is a fractured vertex and has a matching
vertex in the compensated boundary
    Then save the fractured point in the resultant returned boundary
list (result).
}
return result;
}
```

As indicated above, program code instructions may be stored in memory (e.g., memory 304), and executed by a processor (e.g., processor 302), to implement functions of the computing apparatus 102 described herein. As will be appreciated, any suitable program code instructions may be loaded onto a programmable apparatus (e.g., apparatus 300) from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising a processor and a memory storing executable instructions that in response to execution by the processor cause the apparatus to at least:
receive a shell model of a three-dimensional object composed of a plurality of facets including first facets and distinct second facets;
form layer data defining a plurality of layers of the shell model for use in forming the three-dimensional object on a layer-by-layer basis, at least some of the plurality of layers including respective first fragments, and at least some of the plurality of layers including respective second fragments, the first fragments being produced by first facets and exclusive of second facets, and the second fragments being produced by second facets and exclusive of first facets; and
format the layer data for an additive manufacturing system configured to manipulate build material to form the three-dimensional object on a layer-by-layer basis,
wherein at least one layer of the plurality of layers includes both a first fragment of the respective first fragments, and a second fragment of the respective second fragments, and for a layer of the at least one layer, the apparatus being caused to form layer data that defines the layer includes being caused to at least:
form an initial polygon composed of first and second segments produced by respective ones of first and second facets that intersect the layer, a second segment of the first and second segments meeting other segments at a pair of vertices;
copy the pair of vertices a depth within the initial polygon to a corresponding pair of vertices;
create segments to connect vertices of the corresponding pair of vertices, and connect vertices of the pair of vertices with respective ones of the vertices of the corresponding pair of vertices to form an initial second polygon within the initial polygon;
perform a Boolean intersection operation in which the initial second polygon is intersected with the initial polygon to produce a second polygon; and
perform a Boolean difference operation in which the second polygon is subtracted from the initial polygon to produce a first polygon,
wherein the first fragment of the layer defines the first polygon, and the second fragment of the layer defines the second polygon.

2. The apparatus of claim 1, wherein for a layer of the at least one layer that includes both a first fragment of the respective first fragments, and a second fragment of the respective second fragments, the first fragment and second fragment are separated by an offset gap.

3. The apparatus of claim 1, wherein the additive manufacturing system includes a first extruder and a distinct, second extruder configured to dispense respective build material to form the three-dimensional object on a layer-by-layer basis, and wherein the apparatus being caused to format the layer data includes being caused to format the layer data for the respective first fragments for receipt by the first extruder, and the layer data for the respective second fragments for receipt by the second extruder.

4. The apparatus of claim 1, wherein the additive manufacturing system includes a laser configured to emit a beam onto build material to form the three-dimensional object on a layer-by-layer basis, and
wherein the apparatus being caused to format the layer data includes being caused to format the layer data for receipt by the laser, one or more properties of the beam emitted by the laser differing between the layer data for the respective first fragments, and the layer data for the respective second fragments.

5. The apparatus of 1, wherein the additive manufacturing system includes a first printhead and a distinct, second printhead configured to deliver respective binder onto build material to form the three-dimensional object on a layer-by-layer basis, and
wherein the apparatus being caused to format the layer data includes being caused to format the layer data for the respective first fragments for receipt by the first printhead, and the layer data for the respective second fragments for receipt by the second printhead.

6. A method comprising:
receiving a shell model of a three-dimensional object composed of a plurality of facets including first facets and distinct second facets;
forming layer data defining a plurality of layers of the shell model for use in forming the three-dimensional object on a layer-by-layer basis, at least some of the plurality of layers including respective first fragments produced by first facets and exclusive of second facets, and at least some of the plurality of layers including respective second fragments produced by second facets and exclusive of first facets;
formatting the layer data for an additive manufacturing system; and
manipulating build material by the additive manufacturing system according to the layer data so formatted to form the three-dimensional object on a layer-by-layer basis,
wherein at least one layer of the plurality of layers includes both a first fragment of the respective first fragments, and a second fragment of the respective second fragments, and for a layer of the at least one layer, forming layer data that defines the layer includes:
form an initial polygon composed of first and second segments produced by respective ones of first and second facets that intersect the layer, a second segment of the first and second segments meeting other segments at a pair of vertices;
copying the pair of vertices a depth within the initial polygon to a corresponding pair of vertices;
creating segments to connect vertices of the corresponding pair of vertices, and connecting vertices of the pair of vertices with respective ones of the vertices of the corresponding pair of vertices to form an initial second polygon within the initial polygon;
performing a Boolean intersection operation in which the initial second polygon is intersected with the initial polygon to produce a second polygon; and
performing a Boolean difference operation in which the second polygon is subtracted from the initial polygon to produce a first polygon, wherein the first fragment of the layer defines the first polygon, and the second fragment of the layer defines the second polygon.

7. The method of claim 6, wherein for a layer of the at least one layer that includes both a first fragment of the respective first fragments, and a second fragment of the respective second fragments, the first fragment and second fragment are separated by an offset gap.

8. The method of claim 6, wherein the additive manufacturing system includes a first extruder and a distinct, second extruder configured to dispense respective build material to form the three-dimensional object on a layer-by-layer basis, and wherein formatting the layer data includes formatting the layer data for the respective first fragments for receipt by the first extruder, and the layer data for the respective second fragments for receipt by the second extruder.

9. The method of claim 6, wherein the additive manufacturing system includes a laser configured to emit a beam onto build material to form the three-dimensional object on a layer-by-layer basis, and wherein formatting the layer data includes formatting the layer data for receipt by the laser, one or more properties of the beam emitted by the laser differing between the layer data for the respective first fragments, and the layer data for the respective second fragments.

10. The method of claim 6, wherein the additive manufacturing system includes a first printhead and a distinct, second printhead configured to deliver respective binder onto build material to form the three-dimensional object on a layer-by-layer basis, and wherein formatting the layer data includes formatting the layer data for the respective first fragments for receipt by the first printhead, and the layer data for the respective second fragments for receipt by the second printhead.

11. A computer-readable storage medium that is non-transitory and has computer-readable program code portions stored therein that in response to execution by a processor cause an apparatus to at least:

receive a shell model of a three-dimensional object composed of a plurality of facets including first facets and distinct second facets;

form layer data defining a plurality of layers of the shell model for use in forming the three-dimensional object on a layer-by-layer basis, at least some of the plurality of layers includes respective first fragments produced by first facets and exclusive of second facets, and at least some of the plurality of layers includes respective second fragments produced by second facets and exclusive of first facets; and format the layer data for an additive manufacturing system configured to manipulate build material to form the three-dimensional object on a layer-by-layer basis, wherein at least one layer of the plurality of layers includes both a first fragment of the respective first fragments, and a second fragment of the respective second fragments, and for a layer of the at least one layer, the apparatus being caused to form layer data that defines the layer includes being caused to at least:

form an initial polygon composed of first and second segments produced by respective ones of first and second facets that intersect the layer, a second segment of the first and second segments meeting other segments at a pair of vertices;

copy the pair of vertices a depth within the initial polygon to a corresponding pair of vertices;

create segments to connect vertices of the corresponding pair of vertices, and connect vertices of the pair of vertices with respective ones of the vertices of the corresponding pair of vertices to form an initial second polygon within the initial polygon;

perform a Boolean intersection operation in which the initial second polygon is intersected with the initial polygon to produce a second polygon; and perform a Boolean difference operation in which the second polygon is subtracted from the initial polygon to produce a first polygon, wherein the first fragment of the layer defines the first polygon, and the second fragment of the layer defines the second polygon.

12. The computer-readable storage medium of claim 11, wherein for a layer of the at least one layer that includes both a first fragment of the respective first fragments, and a second fragment of the respective second fragments, the first fragment and second fragment are separated by an offset gap.

13. The computer-readable storage medium of claim 11, wherein the additive manufacturing system includes a first extruder and a distinct, second extruder configured to dispense respective build material to form the three-dimensional object on a layer-by-layer basis, and wherein the apparatus being caused to format the layer data includes being caused to format the layer data for the respective first fragments for receipt by the first extruder, and the layer data for the respective second fragments for receipt by the second extruder.

14. The computer-readable storage medium of claim 11, wherein the additive manufacturing system includes a laser configured to emit a beam onto build material to form the three-dimensional object on a layer-by-layer basis, and wherein the apparatus being caused to format the layer data includes being caused to format the layer data for receipt by the laser, one or more properties of the beam emitted by the laser differing between the layer data for the respective first fragments, and the layer data for the respective second fragments.

15. The computer-readable storage medium of claim 11, wherein the additive manufacturing system includes a first printhead and a distinct, second printhead configured to deliver respective binder onto build material to form the three-dimensional object on a layer-by-layer basis, and wherein the apparatus being caused to format the layer data includes being caused to format the layer data for the respective first fragments for receipt by the first printhead, and the layer data for the respective second fragments for receipt by the second printhead.

* * * * *